(12) United States Patent
Rice

(10) Patent No.: US 6,779,293 B1
(45) Date of Patent: Aug. 24, 2004

(54) FISH ATTRACTANT DISPENSER

(76) Inventor: Marc Rice, 5013 SW. 153rd Ter., Davie, FL (US) 33331

( * ) Notice: Subject to any disclaimer, the term of this patent is extended or adjusted under 35 U.S.C. 154(b) by 0 days.

(21) Appl. No.: 10/326,948

(22) Filed: Dec. 23, 2002

Related U.S. Application Data

(63) Continuation of application No. 09/905,372, filed on Jul. 16, 2001, now abandoned.

(51) Int. Cl.[7] .............................................. A01K 85/00
(52) U.S. Cl. ..................................................... 43/42.06
(58) Field of Search ................................ 43/17.6, 42.39

(56) References Cited

U.S. PATENT DOCUMENTS 2,749,647 A * 6/1956 Beloff ....................... 43/42.06
6,412,214 B1 * 7/2002 Sebastiani ................. 43/42.06
6,557,293 B2 * 5/2003 Klapka ...................... 43/42.06

FOREIGN PATENT DOCUMENTS

GB          2055531 A  *  3/1981  .......... A01K/85/00

* cited by examiner

Primary Examiner—Peter M. Poon
Assistant Examiner—Bethany L. Griles

(57) ABSTRACT

A device for dispensing an attractant to lure fish is disclosed. This device is activated by the fisherman incidental to his trolling for fish. The device of this invention comprises a resealable chamber within a hollow body. The chamber provides for containment of fish attractant in the form of a liquid that can be dispensed therefrom only by abrupt movement of the device in response to fisherman directed movement of a line attached to the device.

19 Claims, 2 Drawing Sheets

FISH ATTRACTANT DISPENSER

CROSS-REFERENCE TO RELATED APPLICATION

This Application is a continuation of U.S. Ser. No. 09/905,372, filed Jul. 16, 2001 now abandoned.

BACKGROUND OF THE INVENTION

1. Field of the Invention

This invention relates to an article of manufacture. More specifically, this invention relates to a device in the form of a fishing lures, or in the form of an accessory to a fishing lure, which includes a dischargeable fish attractant.

2. Background of Invention

Artificial lures have long been used to attract and catch fish. Although the effectiveness of fishing lures traditionally depends upon their appearance and action in the water, some prior art lures include a dischargeable attractant to further improve their performance. More particularly, as such a lure is drawn through water, the attractant is discharged and disperses through the water, increasing the likelihood that nearby fish will strike the lure.

The following patents are representative of such prior art:

U.S. Pat. No. 4,799,328 (to Goldman, issued Jan. 24, 1989) discloses a bobber consisting of a lower and upper part; the lower part being a fish attractant receptacle that contains water receiving and discharging ports through which the attractant is released. The amount of attractant flowing through the ports is affected by two means. First, the receptacle contains a sponge-like material which receives the attractant. The water flowing through the ports slowly extracts the attractant from the sponge-like material, lengthening the time interval between attractant applications, and as a consequence, the amount of attractant used. Second, the size of the water receiving and discharging ports are variable thereby controlling the amount of water introduced into the bobber, and the amount of attractant being released.

U.S. Pat. No. 4,888,907 (to Gibbs, issued Dec. 26, 1989) discloses a fishing lure for controllably discharging an attractant. The lure includes a lure body, an attractant-receiving device, and an attractant discharge control device. The attractant-receiving device is designed to receive and discharge the attractant and is positionable in the lure body. The attractant discharge control device is designed to control the discharge of attractant from the attractant-receiving device, to which it is coupled. In one of the Gibbs embodiments, the lure includes a lure body, a storage device coupled to the lure body for pressurizing the attractant, and a device for controlling the discharge of pressurized attractant from the storage device. Alternatively, the lure can be described as including a lure body, an attractant-receiving device positionable in the lure body for receiving and discharging attractant, and an attractant discharge control device coupled to the attractant-receiving device for controlling the discharge of attractant from the receiving device in a manner that is non-responsive to interaction of the lure with a fish.

U.S. Pat. No. 5,142,811 (to Freeman, issued Sep. 1, 1992) discloses a fishing lure comprising a body of appropriate configuration (e.g., a worm, night crawler, or shape of other live bait) and including an elongated passage extending through the body. The passage receives a tubular casing or sleeve having a bore with an open leading end and an open trailing end. A length of fish line (e.g., nylon leader) is received in the bore through the open leading end. A hook includes a shank portion received in the bore through the open trailing end and connected to the fish line in the bore. An optional retainer member, such as a retainer bead or ball, can be slidably mounted on the line proximate the open leading end of the bore so as ear thereagainst to bias the open trailing end against the hook when the lure is pulled through the water. The size/shape of the retainer member can be selected to partially close off the pen leading end of the bore to meter flow of water therethrough in given manner.

U.S. Pat. No. 5,827,551 (to Prochnow, et al., issued Oct. 27, 1998) discloses an attractant formulation for use on fishing lures that is easy to apply, withstands repeated exposures to casting forces and resists removal when a lure coated therewith is fished. The attractant formulations comprise: (a) a stable water-in-oil emulsion made of petrolatum jelly, a water soluble delivery agent, a thickening agent, and (b) a water soluble fish attractant. The attractant formulation is capable of adhering to the exterior surface of artificial lures while allowing the active attractant ingredient to be released slowly into the water. The formulations are also in the form of a soft gel that is easily applied to the surface of a lure by dunking the lure in a wide-mouthed container or squeezing the gel from a conventional container As is evident from the abbreviated listing and discussion of relevant prior art noted above, there exists a variety of different lures or different attractants that have been used to increase the effectiveness of fishing lures in this manner. More specifically, solid and liquid attractants have been employed, depending upon a variety of factors, including the technique used to discharge the attractant and the conditions under which the lure will be used. The manner in which attractants enhance the desirability of the lure to fish has also varied. For example, scented attractants have been used to stimulate the sense of smell in fish near the lure. Many natural and synthetic products, including fish oils and anise, can be used as scented attractants. Other attractants have also been used to make the lure more visually appealing to nearby fish. For example, colored liquid can be discharged from the fishing lure to attract the attention of nearby fish.

Like the different attractants, a variety of different methods have been employed to couple the attractant to the fishing lure. For example, the exterior of an artificial lure, such as a plastic worm, is sometimes treated with a scented attractant to improve the lure's effectiveness. This treatment is typically performed by dipping a portion or the entirety of the lure in a quantity of a liquid attractant. Alternatively, where the surface of the lure includes a plurality of small cavities, solid attractant can be applied to the lure's exterior and compacted in the cavities, allowing at least some of the scented material to disperse through the water.

As an alternative to the use of an attractant on the lure's exterior, various approaches have been developed for discharging attractant from the interior of the lure. For example, hollow lures have been designed for receiving scented solids or scented liquids in a solid matrix. Such lures include a plurality of small openings between the interior and exterior of the lure, allowing water to flow through the lure and disperse at least some of the scented material.

In other embodiments, a liquid attractant is stored in a chamber controllably coupled to a fishing line attached to the lure. The fishing line is connected to a mechanism for controlling the volume of the chamber, an outlet of the chamber, or both. By applying tension to the fishing line, the outlet of the chamber can be opened and its volume reduced, thereby discharging attractant to the surrounding water.

Although each of these prior art arrangements enhances lure performance, they suffer a number of disadvantages.

For example, when the exterior of the lure is provided with attractant, the fisherman typically has no control over the rate or manner of attractant dispersion. This is particularly true when solid attractant is applied to the exterior of the lure because the attractant may easily be dislodged by the force of the water against the lure or by a fish biting or "striking" the lure. The use of a solid attractant inside a hollow, perforated lure body also provides the fisherman with little control over the attractant's discharge rate. The fisherman can only select different attractants and place varying amounts of attractant inside the lure body.

Similarly, embodiments that employ line tension to control the discharge of liquid attractants are inadequate. More particularly, when a fish strikes the lure, the tension in the line will increase, discharging attractant. The occurrence and duration of this discharge is both beyond the fisherman's control and unnecessary, given that the fish has already struck.

In view of the above analysis of the prior art, it would be desirable to provide a fishing lure that can discharge attractant at a controlled rate not dependent, for example, upon line tension or fish interaction. It would be particularly desirable to provide such a lure allowing the discharge of attractant to be controlled in an adjustable manner by the fisherman.

OBJECTS OF THE INVENTION

It is the object of this invention to remedy the above as well as related deficiencies in the prior art.

More specifically, it is the principal object of the present invention to provide a device for dispensing an attractant to lure fish which is activated by the fisherman without elaborate or complex means.

It is another object of this invention to provide a device for dispensing an attractant to lure fish which is integral in a fishing lure.

It is yet another object of this invention to provide a device for dispensing an attractant to lure fish which is independent of a fishing lure.

Additional objects of this invention include the use of one or more of the devices of this invention, alone or in combination, in a method for attracting fish.

SUMMARY OF THE INVENTION

The above and related objects are achieved by providing a device for dispensing an attractant relative to a fish lure which is activated by the fisherman incidental to his trolling for fish. The device of this invention comprises a hollow body within which is effectively sealed a fish attractant. The chamber includes means for containment of fish attractant in the form of a liquid that can be dispensed therefrom by abrupt movement of the chamber in response to fisherman directed movement of a line attached to the device. In one of the preferred embodiments of this invention, the attractant dispensing device of this invention is in the form of a fishing lure (FIG. 1). In another of the preferred embodiments of this invention, the attractant dispensing device of this invention is in the form of a accessory that can be placed in proximity to a fishing lure (FIG. 3).

DETAILED DESCRIPTION OF THE INVENTION INCLUDING PREFERRED EMBODIMENTS

The figures which accompany this application, and referenced herein, depict representative embodiments of this invention. In the embodiments of this invention illustrated in these figures, each of the attractant dispensing devices of this invention comprises a fishing accessory that is designed for use either as a fishing lure, or in proximity to a fishing lure. Accordingly, the embodiments of this invention share common functional features which permit their adaptation, or conjoint use, to attachment to a fishing line for activation by a fisherman during their contemplated use.

Figure 1:
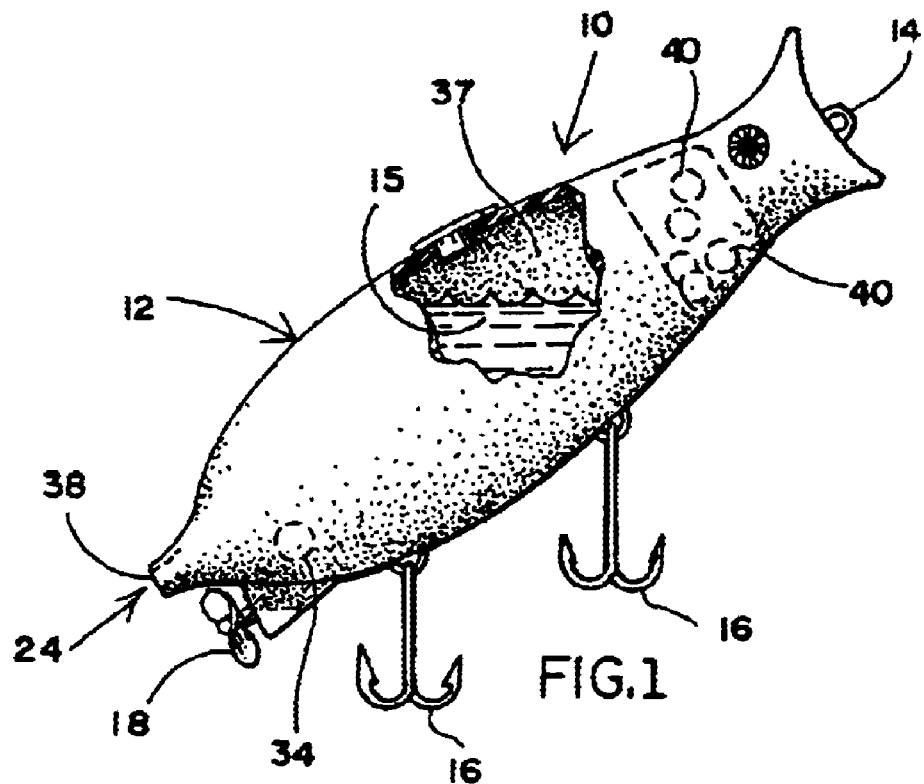
FIG. 1 is a perspective view a device of this invention in the form of fishing lure.

Referring now to FIG. 1, a fishing lure 10 constructed in accordance with a preferred embodiment of the invention is shown wherein the lure comprises the traditional functional components, lure body (12), eye loop (14) for attachment to a leader or fishing line and fish hooks (16). Also included in the embodiment of this invention illustrated in FIG. 1 is an attractant dispersant/mixer in the form of propeller (18). As set forth more fully herein, attractant is dispensed from the body (12) of the device of this invention with the purpose of attracting fish. In order to dispersed the attractant (15) effectively, a dispersing mechanism (18) is affixed to the device to created turbulent flow at the distal end of the device to effect increased mixing of the attractant and the water in the vicinity of the fishing lure.

The device of this invention, in the form of a fishing lure (10), allows a fisherman to control the discharge of an attractant from the lure (10) incidental to his trolling for fish. The discharged attractant then disperses into the water surrounding the lure and, as a result, fish in the surrounding area will be more likely to strike the lure (10), increasing the lure's effectiveness.

In the specific embodiments of the invention illustrated in FIG. 1, the body of the lure comprises a body form shaped like a source of food for game fish. It is generally brightly colored, including striations and other graphics imprinted thereon to be visually appealing to fish. In addition, the lure can and does preferably include one or more fish hooks (16) and means (18) to orient it relative to its movement through the water. In the embodiment of the lure depicted in FIG. 1, the lure is provided with a propeller (18) or an equivalent mechanism to also impart attractive motion to the lure and maintain the orientation of the lure in the water as it moves through the water. As further appreciated, the size and color of the lure (10) may vary depending upon a number of factors including the condition of the water being fished, as well as the species and size of fish sought. In addition, the lure may have any one of a wide variety of conventional shapes depending upon, for example, the type of swimming action and the retrieval depth that are desired. Further, lure body (12) may be made of a variety of materials, with conventional thermoplastics being preferred.

Figure 2:
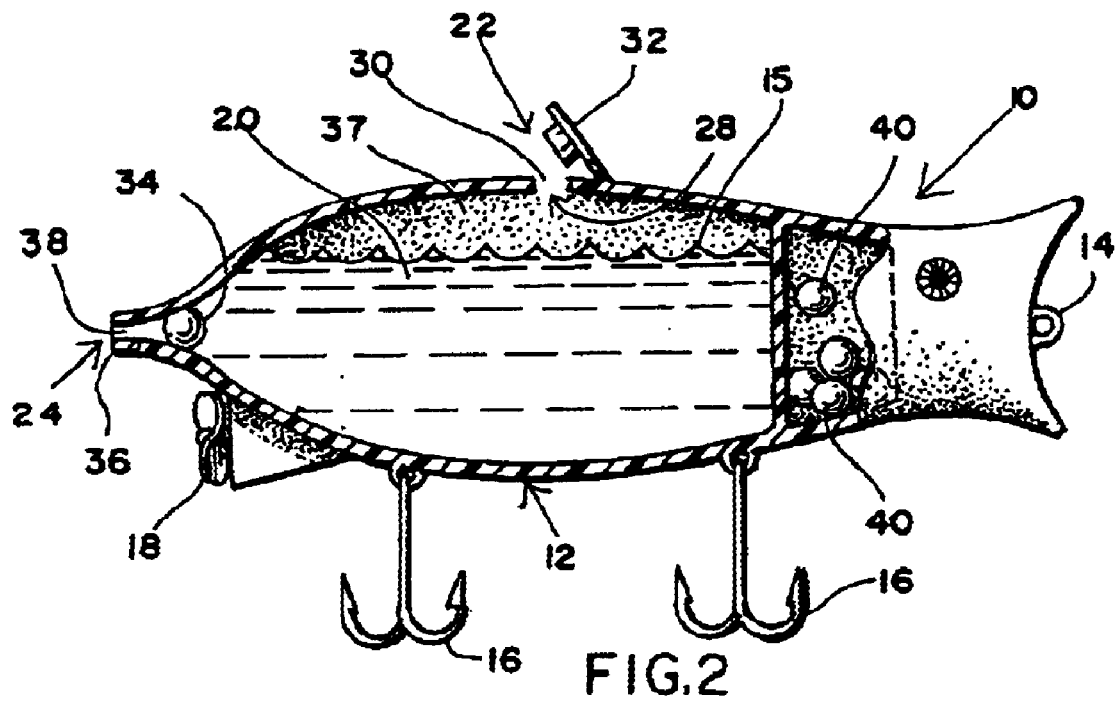
FIG. 2 is a longitudinal sectional view of the device of FIG. 1.

FIG. 2 includes a interior perspective of the lure illustrated in FIG. 1, specifically, an illustration of the interior chamber (20) defined by the lure body (12), and the means associated with this interior chamber (20) for dispensing an attractant in the surrounding waters of the lure. In the embodiment of this invention depicted in FIG. 2, the interior chamber (20) is characterized as having at least three (3) functional features: means for introduction of attractant into the chamber (22); means for dispensing attractant from the chamber (24); means for retaining attractant within the chamber until the dispensing means is activated (37, 38).

In the embodiment of the invention illustrated in FIG. 2, the attractant is introduced into the interior chamber (20) of the lure by means of a resealable opening (28) in the body of the lure. This resealable opening (28) includes a fill hole (30) and its corresponding plug (32), which fits snugly into the fill hole (30). The attractant dispensing means (24) comprises a nozzle-like extension (36) of the lure body wherein the attractant is retained within the channel (38) defined therein unless and until the lure is abruptly jerked. The attractant is retained within the interior chamber (20) until displaced by abrupt movement of the device containing it. It is believed that factors which contribute to the containment and controlled dispensing of the attractant from within the interior chamber (20) include a combination of factors, e.g. the inherent surface tension on the attractant fluid, the diameter of the channel (38) in the dispensing nozzle (36) which is small enough to retain the attractant (15) when the device is not moved abruptly, the air pocket (37) within the chamber (20) to prevent surrounding water from seeping into the chamber, and the ability of the fluid attractant to wet the surfaces of the interior chamber and channel of the dispensing nozzle. The attractant (15) is dispensed from within the interior chamber (20) of the lure by the fisherman's abrupt tensioning of the fishing line during trolling, and optionally a combination of components which operate as a check-valve. These components include a ball (34), or ball bearing, that is capable of movement within the interior chamber (20) of this lure. Further, optionally, ball bearings (40) rattle around inside the lure and provide sonic impulses which also tend to attract fish to the lure.

Figure 3:
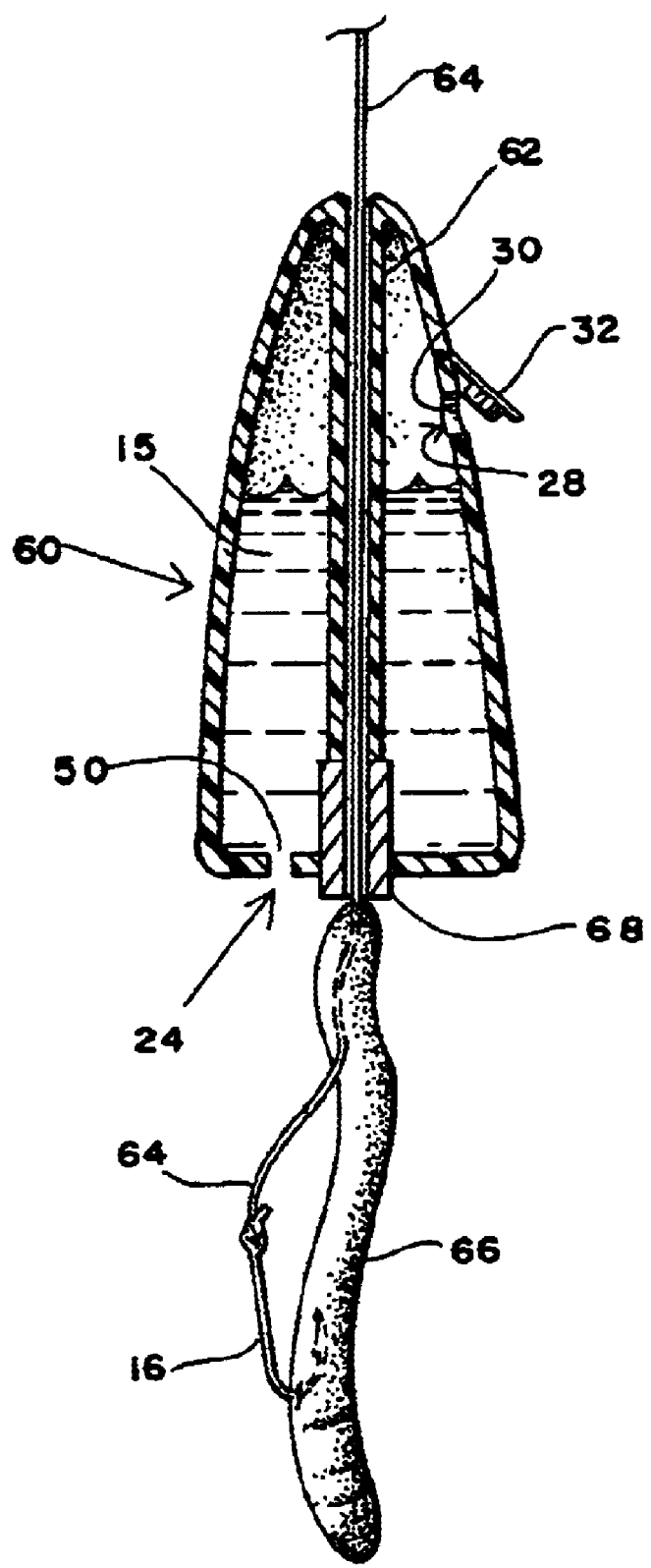
FIG. 3 is a longitudinal cross section view of a device of this invention in the form of a fishing lure accessory (weight/sinker).

In an alternative embodiment of this invention illustrated in FIG. 3, the attractant dispensing device is distinct from the lure, and yet intended/designed for use in proximity thereto to allow for the release of attractant relative to the lure, and to thereby attract fish to the lure. In this embodiment of the invention illustrated in FIG. 3, the attractant dispensing device can take the place of a sinker or weight, and thereby provides a degree of ballast to the lure, while dispensing of the fish attractant. The device illustrated in FIG. 3 comprises an essentially symmetrical hollow body (60) formed around a channel (62) or tube which runs from one end of the device to the other. This channel (62) is of sufficient diameter to accommodate a fishing line (64) or equivalent cable. In FIG. 3, the distal end of the fishing line (64) may be attached to lure (66) (plastic worm), which includes a leader and a fish hook (16). In this embodiment of the invention, the device is further provided with a weight (68). Like the device of FIGS. 1–2, this embodiment of the invention also includes a resealable opening (28), specifically a fill hole (30) and its corresponding plug (32), which fits snugly into the fill hole (30). The attractant (15) is also dispensed in a manner comparable to the device of FIGS. 1–2 through an attractant dispensing means (24) an orifice (50), akin to the nozzle-like extension (36) of FIGS. 1 and 2 of the device body wherein the attractant is retained within the walls of the orifice (50) defined therein unless and until the device is abruptly activated the angler.

Those skilled in the art will recognize that the embodiments of the invention disclosed herein are exemplary in nature and that various changes can be made therein without departing from the scope and the spirit of the invention. In this regard, and as was previously mentioned, the invention is readily embodied with a variety of valve assemblies and attractants. Further, it will be recognized that the interrelationship of these components and their relationship to the lure can be varied as desired. Because of the above and numerous other variations and modifications that will occur to those skilled in the art, the following claims should not be limited to the embodiments illustrated and discussed herein.

What is claimed is:

1. In a device for dispensing a liquid fish attractant by a jigging motion having a hollow body, means for containment of said fish attractant therein, and means for dispensing said fish attractant from within the dispensing device, the improvement comprising:
    A. said hollow body having an opening and a forming a water-impervious chamber for containment of said attractant within said chamber, and an orifice in a wall of said hollow body to allow for discharge of said attractant from said chamber upon abrupt movement thereof during use, and
    B. means for releasable sealing and unsealing of said opening from within said hollow body to permit replenishment of said hollow body with additional liquid attractant
    C. wherein said attractant is released by said jigging motion and said means for releasable sealing and unsealing of said opening is sealed during operation of said device.

2. The improved dispensing device of claim 1, wherein said device is in the form of a fishing lure.

3. The improved dispensing device of claim 1, wherein said device includes attractant dispersing means for mixing said attractant with water surrounding said device.

4. The improved dispensing device of claim 1, wherein said device is in the form of an accessory for use in conjunction with a fishing lure or hook, designed for use in conjunction with a lure or hook.

5. The improved dispensing device of claim 4, wherein said device includes a centrally located tube for accommodation of a fishing line so as to maintain said device in proximity to said lure.

6. The improved dispensing device of claim 1, wherein said device is provided with means for creating sonic impulses that are attractive to fish.

7. The improved dispensing device of claim 1, wherein said device includes colorful graphics on the body thereof so as to be visually attractive to fish.

8. In a device for dispensing a liquid fish attractant in a body of water, said device having a hollow body, means for containment of said fish attractant therein, and means for dispensing said fish attractant from within the dispensing device, the improvement comprising:
    A. said hollow body having an opening and forming a chamber for containment of said attractant and an air pocket within said chamber, and an orifice in a wall of said hollow body to allow for discharge of said attractant from said chamber upon abrupt movement thereof during use whereby said orifice comprises a diameter sufficiently small to retain said attractant within said chamber until said abrupt movement, and sufficiently small to enable said air pocket to prevent said water from entering said chamber, and
    B. means for releasable sealing and unsealing of said opening to permit replenishment of said hollow body with additional liquid attractant.

9. In a device for dispensing a liquid fish attractant having a hollow body, means for containment of said fish attractant therein, and means for dispensing said fish attractant from within the dispensing device, the improvement comprising:

A. said hollow body having an opening and a forming a chamber for containment of said attractant within said chamber, an orifice in a wall of said hollow body to allow for discharge of said attractant from said chamber upon abrupt movement thereof during use, and a valve means for preventing inadvertent discharge of said attractant from said chamber prior to or subsequent to use, and B. means for releasable sealing and unsealing of said opening from within said hollow body to permit replenishment of said hollow body with additional liquid attractant.

10. The device for dispensing a liquid fish attractant of claim 9, wherein said valve means comprises a moveable orifice plug disposed within the interior of said hollow body.

11. The device for dispensing a liquid fish attractant of claim 10, wherein said plug comprises a ball.

12. The device for dispensing a liquid fish attractant of claim 9, wherein said device is in the form of a fishing lure.

13. The device for dispensing a liquid fish attractant of claim 9, wherein said device includes a centrally located tube for accommodation of a fishing line so as to maintain said device in proximity to a fishing lure.

14. The device for dispensing a liquid fish attractant of claim 9, wherein said device includes colorful graphics on the body of the said device so as to be visually attractive to fish.

15. The device for dispensing a liquid fish attractant of claim 9, wherein said device includes means for creating sonic impulses to be attractive to fish.

16. The device for dispensing a liquid fish attractant of claim 15, wherein said sonic impulse creation means comprises one or more rattlers.

17. A method for dispensing a liquid fish attractant from a hollow device, the steps comprising;

attaching said device to a fishing line, filling said device at the fill hole with said attractant and sealing said file hole, casting said device with said fishing line into a body of water, releasing said attractant into the water by jigging said device, and preventing the unwanted release of said attractant by not jigging, or abruptly moving, said device.

18. The method of claim 17, wherein said device comprises a fishing lure.

19. The method of claim 18, wherein said lure comprises a hollow body having an orifice, for egress of said attractant, wherein said orifice tapers to form a seat upon which a ball bearing disposed within the said body can seal said orifice to form a check valve to prevent unwanted discharge of said attractant.

* * * * *